US00RE43323E

(19) United States
(12) Reissued Patent
Jürgensen et al.

(10) Patent Number: US RE43,323 E
(45) Date of Reissued Patent: Apr. 24, 2012

(54) TRANSMISSION OF RANDOM ACCESS BURSTS WITH AT LEAST ONE MESSAGE PART

(75) Inventors: Jens-Uwe Jürgensen, München (DE); Richard Stirling-Gallacher, Stuttgart (DE); Paul James, Bochum (DE); Stefan Kornprobst, Cologne (DE); John Halton, Ulm (DE)

(73) Assignee: Sony Deutschland GmbH, Berlin (DE)

(21) Appl. No.: 11/142,887

(22) Filed: Jun. 1, 2005

Related U.S. Patent Documents

Reissue of:

(64) Patent No.: 6,574,212
Issued: Jun. 3, 2003
Appl. No.: 09/411,435
Filed: Oct. 1, 1999

(30) Foreign Application Priority Data

Oct. 5, 1998 (EP) ..... 98118816
Apr. 16, 1999 (EP) ..... 99107648
Aug. 4, 1999 (EP) ..... 99115411

(51) Int. Cl.
*H04B 7/212* (2006.01)

(52) U.S. Cl. ..... 370/348; 370/341; 370/337; 370/442; 370/468

(58) Field of Classification Search ..... 370/348, 370/341, 337, 442, 468, 328, 329, 335
See application file for complete search history.

(56) References Cited

U.S. PATENT DOCUMENTS 4,763,325 A * 8/1988 Wolfe et al. ..... 370/322
(Continued)

FOREIGN PATENT DOCUMENTS

EP 0 616 281 9/1994
(Continued)

OTHER PUBLICATIONS

Liang-Seng Koh et al: "A wireless multiple access control protocol for voice-data integration" Proceedings. 1996 International Conference on Parallel and Distributed Systems (Cat. No. 96TB100045), Proceedings of 1996 International Conference on Parallel and Distributed Systems, Tokyo, Japan, Jun. 3-6, 1996, pp. 206-213, XP002117932 1996, Los Alamitos, CA, USA, IEEE Comput. Soc. Press, USA ISBN: 0-8186-7267-6.

(Continued)

*Primary Examiner* — Cong Tran
(74) *Attorney, Agent, or Firm* — Frommer Lawrence & Haug LLP; William S. Frommer

(57) ABSTRACT

The present invention proposes communication devices (1, 6) and a method for transmitting and receiving random access bursts in a random access channel of a digital telecommunication system. Thereby, a random access burst comprising a preamble part for acquiring a part of said random access channel and at least one message part for transmitting data in said acquired part of the random access channel is generated, whereby the number of message parts depends on an amount of data to be transmitted in the message parts. In case that two or more message parts are generated, each preceding message part comprises a continuation indicator indicating a succeeding message part. After transmission of such a random access burst, the continuation indicator is detected and a further part of the random access channel is reserved for the succeeding message part. Advantageously, the random access channel comprises a number of random access slots being divided into a first section containing contention based random access slots and a second section containing reservation based random access slots, whereby the preamble part of a random access burst comprising two or more message parts is transmitted in said second section. The present invention has the advantage that a higher amount of random access data can be transmitted within one random access burst in a simple way without enhancing the contention-based access to the random access channel.

27 Claims, 4 Drawing Sheets

U.S. PATENT DOCUMENTS

Figure 1:
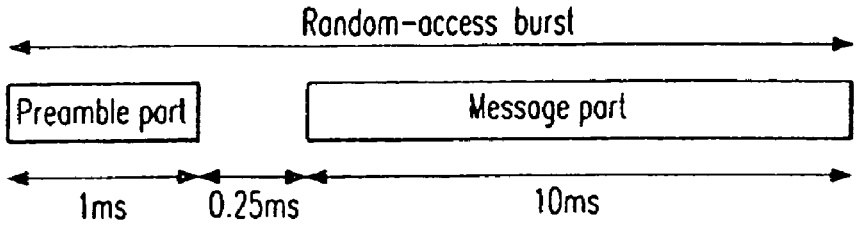

| | | | | |
|---|---|---|---|---|
| 5,123,029 | A | 6/1992 | Bantz et al. | |
| 5,204,976 | A * | 4/1993 | Baldwin et al. | 455/234.2 |
| 5,307,348 | A * | 4/1994 | Buchholz et al. | 370/348 |
| 5,521,925 | A * | 5/1996 | Merakos et al. | 370/337 |
| 5,761,239 | A * | 6/1998 | Gold et al. | 375/150 |
| 5,970,092 | A * | 10/1999 | Currivan | 375/232 |
| 6,078,577 | A * | 6/2000 | Bishop et al. | 370/348 |
| 6,240,083 | B1 * | 5/2001 | Wright et al. | 370/348 |
| 6,404,753 | B1 * | 6/2002 | Chien et al. | 370/337 |
| 6,597,675 | B1 * | 7/2003 | Esmailzadeh et al. | 370/335 |
| 6,606,313 | B1 * | 8/2003 | Dahlman et al. | 370/347 |
| 6,643,275 | B1 * | 11/2003 | Gustafsson et al. | 370/328 |
| 2002/0089957 | A1 * | 7/2002 | Viero | 370/336 |

FOREIGN PATENT DOCUMENTS

| | | |
|---|---|---|
| EP | 0 621 708 | 10/1994 |
| EP | 0 673 103 | 9/1995 |
| EP | 0 765 096 | 3/1997 |
| GB | 2 301 752 | 12/1996 |
| WO | WO 90 13983 | 11/1990 |
| WO | WO 97/06622 | 2/1997 |
| WO | WO 98/18280 | 4/1998 |
| WO | WO 99 16142 | 4/1999 |

OTHER PUBLICATIONS

"Specifications of Air-Interface for 3G Mobile System", Association of Radio Industries and Businesses (ARIB), Jan. 14, 1999, vol. 3, ver. 1.0.

3G TS 25.211 V3.1.1 (Dec. 1999), 3rd Generation Partnership Project; Technical Specification Group Radio Access Network; Physical channels and mapping of transport channels onto physical channels (FDD) (3G TS 25.211 version 3.1.0), Dec. 1999, pp. 1-37.

TR 101 146, V3.0.0 (Dec. 1997), Universal Mobile Telecommunications System (UMTS); UMTS Terrestrial Radio Access (UTRA); Concept evaluation (UMTS 30.06 version 3.0.0), pp. 1-173.

Specifications of Air-Interface for 3G Mobile System, Table of Content, vol. 3, ver.1.0, (Dec. 1997).

* cited by examiner

TRANSMISSION OF RANDOM ACCESS BURSTS WITH AT LEAST ONE MESSAGE PART

Matter enclosed in heavy brackets [ ] appears in the original patent but forms no part of this reissue specification; matter printed in italics indicates the additions made by reissue.

The present invention relates to devices for transmitting and receiving data in a digital telecommunication system, as e. g. a base station or a mobile terminal, and to a method for transmitting and receiving random access bursts in a random access channel of a digital telecommunication system.

In a telecommunication system, data are communicated between base stations and mobile stations. Thereby, the communication area is divided in cells, in which one base station communicates with one or more mobile stations. The data transmission from a mobile station to a base station is called uplink and the data transmission from a base station to one or more mobile stations is called downlink. For the uplink and the downlink, several transmission channels for the transmission of control and user data are available, e. g. a broadcast control channel, a synchronization channel, a user data channel, a random access channel etc. In some telecommunication systems, a communication also between mobile terminals is possible.

A communication device of the telecommunication system, as e. g. a base station or a mobile terminal, may not have an existing dedicated connection to another communication device of the telecommunication system, but may wish to start the transmission of control or user data. An example of such data may be an initial setup message to be sent from a mobile terminal to a base station to establish a first signaling connection. Usually, the random access channel is used for this purpose since it does not require prior negotiation, whereby the random access channel is accessed randomly by the communication device (usually a mobile terminal) requiring a connection. Thereby, the random access data transmitted from a mobile station to a base terminal can e. g. contain a request, if the base station has sufficient resources available to build up the required connection or to transfer user data.

Usually, a random access burst consists of a preamble part and a message part as shown in FIG. 1. The preamble part may have a length of 1 ms, and the message part may have a length of 10 ms, whereby a time delay is present between the preamble part and the message part.

The random access channel used for the transmission of the random access bursts comprises or consists of succeedingly or periodically provided random access time windows, in which several random access slots are available. The different random access slots are randomly chosen by a communication device for the transmission of random access data. E. g. in a currently proposed wide band direct sequence CDMA (WCDMA) system, the random access channel is based upon an initial preamble spreading code. The spreading code for each cell needs to be planned to ensure that neighboring cells do not use the same preamble spreading code. Within the preamble part of each random access burst, is provided the preamble signature code, which is one of a number of separate codes, i. e. 16, available for use within that cell. These separate preamble signature codes can be seen as separate slots, as indicated in the scheme shown in FIG. 2, in which 16 separate preamble signatures are shown as an example. One of these preamble signature codes is chosen randomly by a communication device for the transmission of the preamble part of the random access burst.

Figure 2:
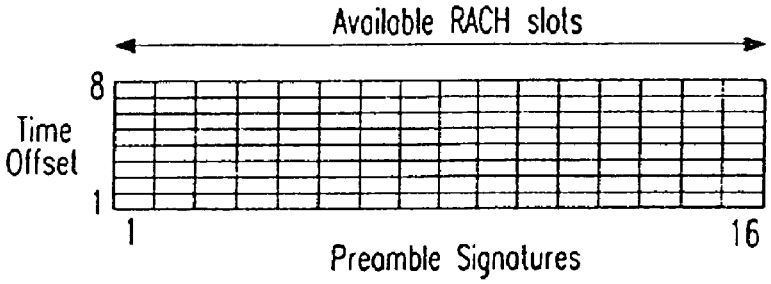

Beforehand, the base station or the respective cell controlling unit signals, e. g. over the broadcast control channel, which codes are available in each cell. Additionally, within the time frame for the transmission of a random access burst (10 ms) are provided a number of time offsets, each of 1.25 ms allowing a further 8 variations. In other words, in each time frame a random access time window is provided, a scheme of which is shown in FIG. 2 and which comprises a plurality of random access slots for transmitting random access data. The random access time window thereby extends over a time frame of 10 ms, so that 128 different random access slots (16 separate preamble codes and 8 time offsets) are provided within one random access time windows. It is to be noted that the above-mentioned numbers are only used as examples and other numbers can be chosen depending on system requirements.

The preamble signature code, i. e. the signature code of the preamble part of a random access burst determines the spreading code for the message part of this random access burst. As shown schematically in FIG. 3, the preamble signature points to a place in the spreading code tree available for the message part. The message part is then transmitted with this spreading code, e. g. with a spreading factor 16 or 32. Thus, the possibility of collisions between message parts simultaneously transmitted from different communication devices is significantly reduced.

Figure 4:
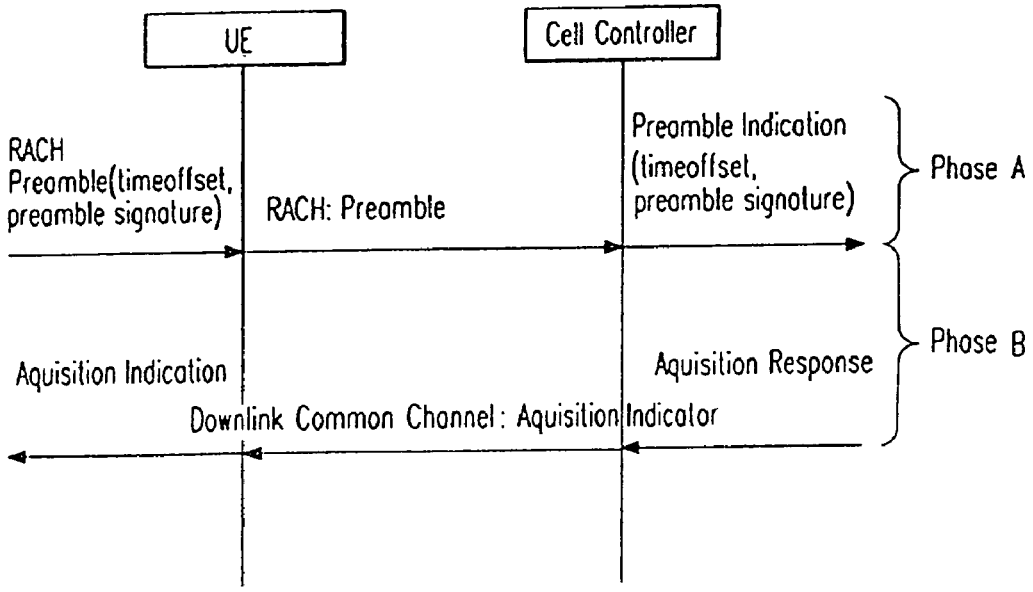

In FIG. 4, a sequence of exchanged data between a first communication device, i. e. a user equipment or mobile terminal, and a second communication device, i. e. a cell controller or a base station of the telecommunication system is schematically shown.

The mobile terminal attempting to transmit random access data in the random access channel firstly transmits the preamble part to the base station. The preamble part, as explained above has an allocated unique combination of a preamble signature and a time offset randomly chosen from the available values. Thus, a collision of two preamble parts simultaneously sent from two different mobile terminals to a receiving base station only occurs if the two preamble parts have the same preamble signature and the same time offset. A base station properly receiving a preamble part transmits an acquisition response, e. g. on a downlink common channel, back to the mobile terminal. By means of the acquisition response, the base station signals to the mobile terminal that it is expecting the message part. Then, the mobile terminal transmits the corresponding message part to the base station. In case that the base station does not send an acquisition response, the message part is not sent. The message part contains the random access data. Since the length of the message part is fixed, e. g. 10 ms, the amount of data to be transmitted within one message part is restricted. However, in many cases the size of the message part of the random access burst will be insufficient, so that the random access data to be transmitted have to be segmented over a number of different random access bursts. The transmission of a number of random access bursts is problematic since the transmission is contention-based and there is an increased possibility of collisions when a number of random access bursts is transmitted sequentially. Further, this leads to an undeterminable duration for the random access data transmission. Further, for each random access data segment, a new random access burst has to be formed and to be transmitted. Further, each preamble part has to be successfully received in a receiving device and answered by a positive acquisition response so that the corresponding message part can be transmitted. Then, the random access data of the different message parts transmitted within the different random access bursts have to be reassembled in the receiving device into the complete data set.

The object of the present invention is therefore to provide devices for transmitting and receiving data in a digital telecommunication system and a method for transmitting and receiving random access bursts in a random access channel of a digital telecommunication system, which enable the transmission of a larger amount of random access data in a simple and efficient way.

The above object is achieved by a device for transmitting and receiving data in a digital telecommunication system, in which a random access channel for transmitting random access bursts is provided, with generating means for generating a random access burst comprising a preamble part for acquiring a part of said random access channel and at least one message part for transmitting data in said acquired part of said random access channel, the number of message parts depending on an amount of data to be transmitted in the message parts, whereby in case that two or more message parts are generated, the generating means generates said random access burst with at least one continuation indicator indicating said two or more message parts, and transmitting means for transmitting the random access burst generated by said generating means. This device according to the present invention is e. g. a mobile terminal of the telecommunication system.

Thus, the device according to the present invention enables the transmission of large amounts of random access data in a random access burst by providing several message parts within one random access burst. After the transmission of a preamble part and the corresponding acquisition response from a receiving device, several message parts can be transmitted without the necessity to transmit a preamble part for each transmitted message part. The random access burst contains an continuation indicator which informs the receiving device that the random access burst comprises more than the usual one message part. The receiving device, e. g. a base station of the communication system, then reserves a part of the random access channel, e. g. on the basis of the spreading code of the message part which is determined by the signature code of the preamble part, so that an undisturbed reception of the succeeding message part(s) is assured. Another communication device attempting to access the random access channel with a preamble part having the same signature code will not receive an acquisition indicator from the receiving device during the reservation period. Once the access to the random access channel is granted, a transmitting communication device according to the present invention is able to transmit a large amount of random access data within a plurality of message parts without the risk that the access to the random access channel is refused due to contention.

Advantageously, the generating means generates a random access burst comprising two or more message parts so that a continuation indicator is contained in at least the first message part. Thereby, the continuation indicator may contain information on how many message parts are comprised in the random access burst.

In the first advantageous example of a device transmitting a random access burst according to the present invention, the generating means generates a random access burst comprising two or more message parts so that each preceding message part comprises a continuation indicator indicating an immediately succeeding message part. Thereby, the generating means may further advantageously generate a random access burst comprising two or more message parts so that the last of the message parts comprises an end indicator indicating the message part to be the last message part. Thereby, the continuation indicator and/or the end indicator may be located at the end of the respective message part. This enables to maintain the normal structure of the message parts, since the continuation indicator and/or the end indicator is just added to the end of the message part. Further, the continuation indicator and/or the end indicator may consist of a single bit in the respective message part. Hereby, a receiving device can decide in a simple way if a further message part will follow. Advantageously, the continuation indicator as well as the end indicator may consist of a single bit and have different bit values, which enables simple processing structures on the transmitter side and on the receiver side.

In a second advantageous example of a device transmitting a random access burst according to the present invention, the random access channel comprises a number of random access slots being divided into a first section containing contention-based random access slots and a second section containing reservation-based random access slots, whereby the transmitting means transmits the preamble of a random access burst comprising two or more message parts in said second section. Thereby, a receiving device receiving the preamble in the second section knows that the corresponding burst will comprise two or more message parts. This is particularly advantageous since a receiving device receiving a preamble part in the second section may immediately reserve a further part of the random access channel for the receiving of the second message part after the reception of the usual first message part. In this case, the generating means further advantageously generates the preamble of a random access burst comprising two or more message parts by randomly choosing one of the random access slots of the second section, whereby a preamble signature code allocated to the chosen random access slots serves as a continuation indicator indicating that a second message part will be transmitted after the first message part. This is particularly advantageous in a code division multiple access (CDMA) system, in which the signature code of a preamble part of a random access burst determines the spreading code of the succeeding message part since a receiving device is then able to reserve the further part of a random access channel in a simple way. Further advantageously in this case, the generating means generates a random access burst comprising three or more message parts so that each first message part out of three immediately succeeding message parts comprises a continuation indicator indicating that the third message part will be transmitted after the second message part.

In this way, the receiving device knows in due time that a further message part will be transmitted after the immediately succeeding message part and is thus able to reserve a corresponding part of the random access channel.

A device for receiving random access bursts according to the present invention comprises receiving means for receiving a random access burst comprising a preamble part for acquiring a part of said random access channel and at least one message part for transmitting data in said acquired part of said random access channel, the number of message parts depending on an amount of data to be transmitted in the message part, detecting means for detecting a continuation indicator in a received random access burst, said continuation indicator indicating that said random access burst comprises at least two message parts and reserving means for reserving a further part of said random access channel for receiving said message parts upon detection of said continuation indicator.

Advantageously, the detecting means is adapted to detect the continuation indicator in at least a first received message part. The continuation indicator may contain information on the number of message parts contained in the random access burst. Further advantageously, the reserving means, upon detecting said continuation indicator in a received message part, reserves a further part of said random access channel for an immediately succeeding message part. Thereby, only the corresponding part of the random access channel for receiving the very next message part is reserved. Further advantageously, the detecting means is further adapted to detect an end indicator in a received message part, said end indicator indicating the message part to be the last message part of at least two message parts, whereby the reserving means terminates the reservation of the random access channel upon the detection of said end indicator.

In case that the random access channel comprises a number of random access slots being divided into a first section containing contention-based random access slots and a second section containing reservation-based random access slots, the reserving means of the receiving device of the present invention, reserves, after the reception of a preamble part of a random access burst in said second section, a further part of the random access channel for receiving at least two message parts. Upon reception of a preamble part in said second section, the receiving device therefore knows that at least one second message part after the usual first message part will be transmitted. In this case, the detecting means, after the reception of a preamble part of a random access burst in said second section, treats the preamble signature code of the preamble part as the continuation indicator indicating that a second message part will be transmitted after the first message part, whereby the reserving means reserves a further part of said random access channel for receiving said second message part. The reserving means may thereby reserve the further part of the random access channel by blocking out the preamble signature code of the received preamble part, i. e. by not sending an acquisition indicator upon a reception of a preamble part having the same signature code from another transmitting device.

Further advantageously, the reserving means, upon detection of a continuation indicator in a received message part of the random access burst, reserves a further part of said random access channel for receiving a further message part of the immediately succeeding message part. Thereby, in case that the random access burst comprises three or more message parts, the necessary parts of the random access channel can be reserved in due time.

The proposed communication devices and the proposed method of the present invention are particularly advantageous, since they support the use of a random access burst having a standard length, i.e. the proposed scheme is backward compatible. In the case that the continuation indicator is the last bit of the message part and this bit is set to zero, the message part corresponds to a standard length message part.

Further advantageously the two or more message parts are continuously, i.e. directly one after the other, transmitted and received. Hereby, a very efficient transmission of message parts can be achieved.

Figure 3:
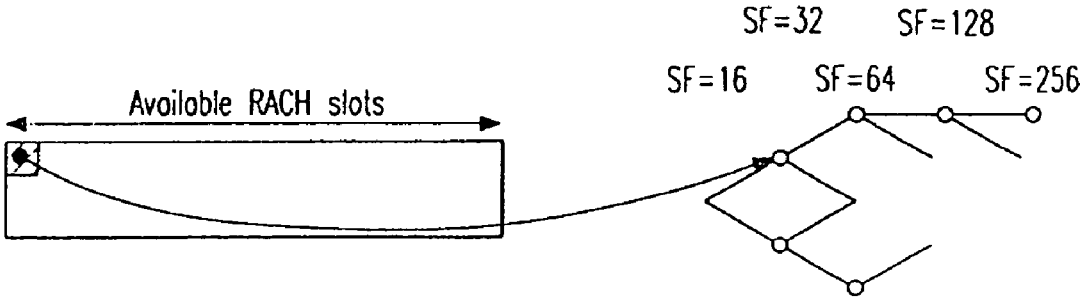
Figure 5:
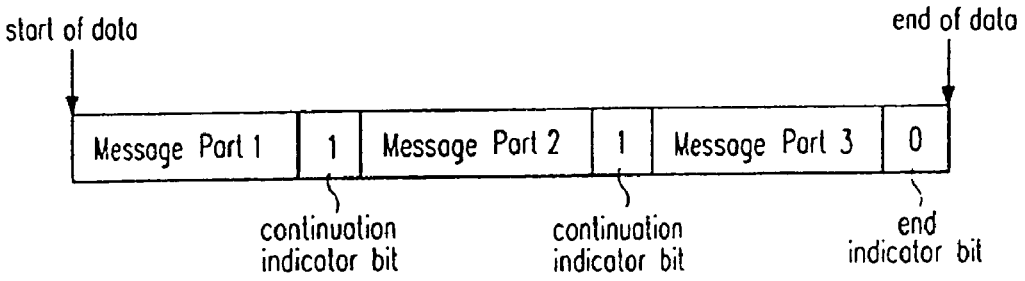
Figure 6:
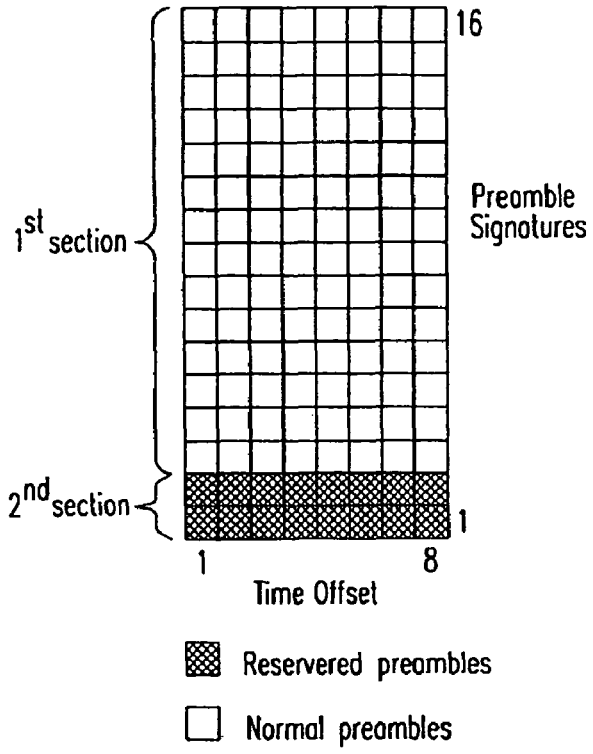
Figure 7:
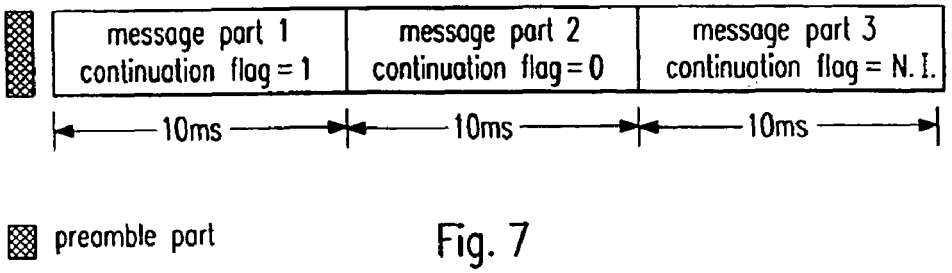
Figure 8:
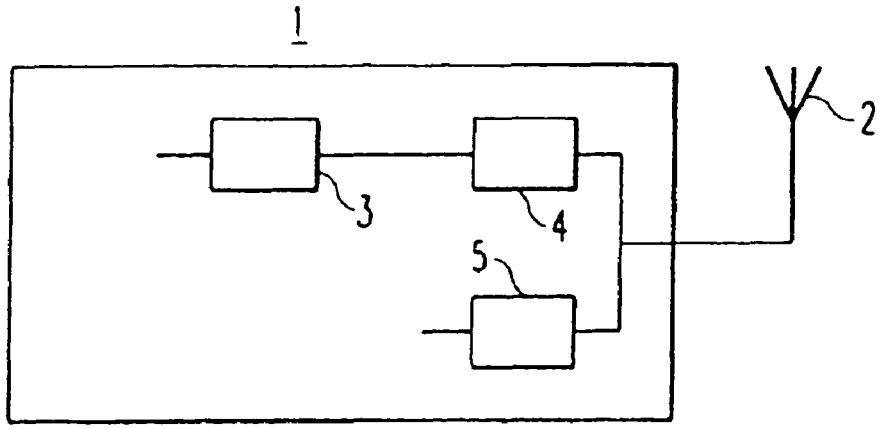
Figure 9:
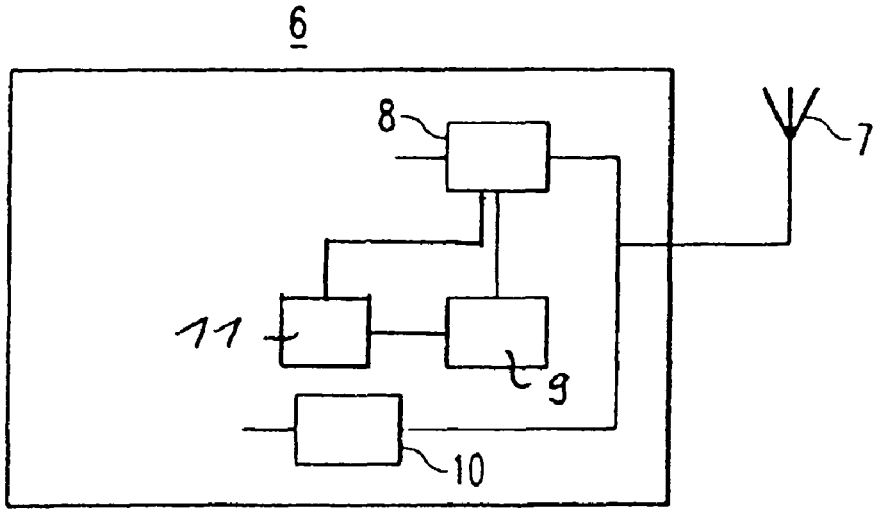

The present invention is explained in more detail in the following description by means of preferred embodiments relating to the enclosed drawings, in which FIG. 1 shows the structure of a known random access burst, FIG. 2 shows a scheme of available random access slots defined by a respective combination of a preamble signature and a time offset, FIG. 3 shows the allocation of a scrambling code to a message part on the basis of the signature code of the preamble part, FIG. 4 shows the acquisition scheme of the random access channel, FIG. 5 shows the structure of several message parts of a first example of a random access burst according to the present invention, FIG. 6 shows schematically a random access channel comprising a number of random access slots being divided into a first section containing contention-based random access slots and a second section containing reservation-based random access slots, which will be used for longer RACHs, FIG. 7 shows the structure of a second example of a random access burst according to the present invention, FIG. 8 shows a communication device generating and transmitting random access bursts according to the present invention, and FIG. 9 shows a communication device receiving random access bursts according to the present invention.

FIG. 5 shows the structure of several succeeding message parts of a first example of a random access burst according to the present invention. The random access burst of the present invention also comprises a preamble part preceding the message parts as explained in relation to FIGS. 1 to 4. In the example of FIG. 5, the continuation indicator is located at the end of a respective message part. The first message part and the second message part respectively comprise an continuation indicator at the end of their data. The third and last message part comprises an end indicator indicating the end of the random access data transmitted in the random access burst. The continuation indicators of the first and the second message part may e. g. have the value "1", and the end indicator of the third message part can have the value "0". Thus, a communication device receiving the first message part receives the bit value "1" at the end of the first message part and the second message part and therefore knows that a further message part is being transmitted. The receiving communication device reserves the corresponding part of a random access channel, i. e. the time period necessary for the transmission of the message part, so that a proper reception of the following message part is assured. As soon as the receiving communication device receives the bit value "0", e. g. at the end of the third message part, it knows that no further message parts are being transmitted, releases the reservation and provides the remaining or next part of the random access channel for contention-based random access attempts.

FIG. 6 shows schematically the general time frame structure or the time window of a random access channel according to the present invention. The time window has, e. g. a length of 10 ms, as the message part of a usual random access burst. The time window comprises a number of random access slots, whereby each slot is defined by a preamble signature and a time offset. In the shown example, 16 preamble signatures and 8 time offsets within a time frame of 10 ms are provided. Thus, theoretically 128 possibilities of transmitting a random access burst are possible. Each time offset has a length of 1.25 ms. The 16 preamble signatures are typically allocated to one cell of the communication system, whereby the 16 preamble signatures are typically transmitted from a respective base station to the mobile terminals. According to the present invention, the random access time window comprises a number of random access slots, which are divided in a first section and a second section. The first section, in the example shown in FIG. 6 the time slots with the preamble signatures 3 to 16, are contention-based random access slots, which means that the different connected mobile terminals in one cell of the communication system randomly choose a time offset 1 to 8 and a preamble signature 3 to 16 to transmit a preamble part of a random access burst to the base station to gain access to the network. Since the preamble signatures and the time offsets are randomly chosen by the mobile terminals, collisions between preamble parts from two different mobile terminals having chosen the same time offset and the same preamble signature may occur. The second section of the random access slots of the random access time window of the present invention comprises reservation-based random access slots, in the example shown in FIG. 6 the random access slots having the preamble signatures 1 and 2. These slots are preselected and are allocated to random access bursts having two or more message parts. A mobile terminal intending to transmit a random access burst with two or more message parts to the corresponding base station randomly chooses a time offset 1 to 8 and a preamble signature 1 or 2 from the second section. A base station receiving a preamble part of a random access burst chosen from the second section recognizes the preamble signature as being chosen from the second section and therefore knows that a corresponding random access burst will comprise more than one message part and reserve further parts of the random access channel correspondingly.

The distribution of random access slots to the first section and of contention-based random access slots and the second section of reservation-based random access slots may either be preset or varied during operation. In case that the distribution is preset, each of the mobile terminals always uses the same random access slots for the first section and the same random access slots for the second section. However, it can be advantageous to vary the distribution of random access slots depending on system requirements. In this case, the base station sets the distribution of random access slots in the first section and the second section on the basis of information on unsuccessful access attempts received from the mobile terminals. After setting the distribution of the random access time slots correspondingly, the base station transmits corresponding information to the mobile terminals. The mobile terminals then know which time offsets and preamble signatures are allocated to the first section and to the second section, respectively.

In FIG. 7, the structure of a random access burst according to the present invention is shown. In the example shown in FIG. 7, the random access burst comprises a preamble part and three succeeding message parts. A mobile terminal transmitting this random access burst chooses a random access slot from the second section of the random access time window, e. g. one of the time offsets 1 to 8 and one of the preambles 1 or 2 as shown in FIG. 6. A base station receiving this preamble part properly then sends an acquisition indicator back to the mobile terminal, as explained in relation to FIG. 4, and grants the corresponding part of the random access channel so that the mobile terminal may transmit the first message part to the base station. The base station having received the preamble part with a preamble signature 1 or 2 knows, however, that the succeeding random access burst will comprise more than one message part. Therefore, the base station reserves a further part of the random access channel for receiving the second message part immediately after the first message part. According to the present invention, the first message part comprises a continuation indicator or continuation flag indicating to the base station that a third message part will follow after the second message part. The base station receiving the first message part therefore detects the continuation indicator and reserves a further part of the random access channel for receiving the third message part after the second message part. Then, the base station receives the second message part immediately after the first message part. The second message part comprises also a continuation indicator, which in this case is an end indicator since it indicates that after the third message part no further message part will follow. In the example shown in FIG. 7, the continuation indicators consist of one bit in the respective message part, which is preferably located at the end of the respective message part. The continuation indicator of the first message part indicating that the third message part will follow has e. g. the value "1", whereas the continuation indicator in the second message part indicating that no further message part will follow after the third message part has the value "0". Since the message parts of the random access burst according to the present invention have the same length of 10 ms and are generated and built in the same way in a respective mobile terminal, the third message part usually comprises a continuation indicator bit, too. The value of this continuation indicator, however, is not important (N. I.) and may be set to any value, since the random access burst will end after this part. It is to be noted, that the proposed scheme of transmitting extended random access bursts having two or more message parts is particularly advantageous since it does not require complex signaling and only minimal changes are needed to fit the proposed random access burst scheme to presently proposed wireless telecommunication schemes basing on code division multiple access.

FIG. 8 shows the general structure of a communication device 1 for transmitting random access bursts according to the present invention. The communication device 1 can e. g. be a mobile terminal of the telecommunication system. The communication device 1 comprises a generating means 3 for generating a random access burst according to the present invention, comprising a preamble part and at least one message part, whereby the number of message part depends on the amount of random access data to be transmitted. In case that the random access burst to be transmitted comprises two or more message parts, the generating means 3 generates the random access burst with at least one continuation indicator indicating that the random access burst comprises two or more message parts. The first possibility in this case is that, like explained in relation to FIG. 5, the first message parts comprises a continuation indicator indicating an immediately succeeding second message part will follow. In the same way, the second message part in this case comprises a continuation indicator indicating that a third message part will follow. In case that the random access comprises three message parts, as for example shown in FIG. 5, the last message part, i. e. the third message part comprises an end indicator indicating that this is the last message part. Generally speaking, the generating means 3 of the transmitting device 1 may generate the random access burst and the corresponding continuation indicators according to the present invention in two different ways. The first possibility is the possibility shown in FIG. 5, in which the generating means 3 generates the random access burst comprising two or more message parts so that each preceding message part comprises a continuation indicator indicating an immediately succeeding message part. The second possibility is the possibility shown and explained in relation to FIGS. 6 and 7, in which the random access channel comprises a number of random access slots being divided into a first section containing contention-based random access slots and a second section containing reservation-based random access slots, whereby the transmitting means 4 of the transmitting device 1 transmits the preamble part of a random access burst comprising two or more message parts in said second section. Thus, the generating means 3 randomly chooses a preamble signature from the preamble signatures allocated to the second section, e. g. one of the preamble signatures 1 or 2 as shown in FIG. 6 and the transmitting means 4 transmits the preamble part correspondingly. A receiving device, as e. g. a base station 6 as shown in FIG. 9, recognizes the preamble signature as being allocated to the second section and therefore knows that at least a second message part will follow. Thus, the preamble signature serves as continuation indicator indicating that a second message part will be transmitted after the first message part. The first message part comprises a continuation indicator indicating that a third message part will follow after the second message part in case that the random access burst comprises three message parts as e. g. shown in FIG. 7. The second message part comprises and end indicator indicating that no further message part will follow after the third message part.

In both cases explained above, the continuation indicators may consist of one bit in a respective message part, which may be located at the end of the respective message part. Further, the continuation indicators and the end indicators consisting of a 1 bit value, respectively, should have different values, as e. g. "0" or "1".

As stated above, the communication device 1 comprises the transmitting means 4 for transmitting the random access burst generated by the generating means 3. The transmitting means 4 can e. g. be a RF means, which transmits the random access bursts by means of an antenna 2 of the communication device 1. Further, the communication device 1 comprises receiving means 5 for receiving data from other communication devices of the telecommunication system, e. g. for receiving an acquisition response from a base station in response of a transmitted preamble part for acquiring access to a random access channel to transmit random access data, as e. g. explained above in relation to FIG. 4.

It is to be noted, that the communication device 1 shown in FIG. 8 further comprises all necessary elements for transmitting and receiving data in a telecommunication system, as e. g. encoders, decoders, modulators, demodulators etc. However, FIG. 8 only shows the elements important for and in relation to the present invention. The same is true for the communication device 6 shown in FIG. 9, which might be a base station of the telecommunication system.

FIG. 9 shows the general structure of the communication device 6, which is adapted to receive random access bursts of the present invention as e. g. transmitted by the communication device 1 shown in FIG. 8. The communication device 6 comprises an antenna 7 for receiving and transmitting data in the telecommunication system and a receiving means 8 for receiving a random access burst comprising a preamble part for acquiring a part of the random access channel and at least one message part for transmitting data in the acquired part of the random access channel. Further, the communication device 6 comprises detecting means 9 for detecting a continuation indicator in a received random access burst and a reserving means 11 for reserving a further part of said random access channel for receiving a succeeding message part. Thus, if the receiving means 8 receives e. g. the message part 1 shown in FIG. 5, the continuation indicator bit "1" at the end of the message part is detected and a further time period corresponding to the length of a further message part is reserved. Then, the receiving means 8 receives the second message part and detects a further continuation indicator bit "1" at the end of the second message part to reserve another part of the random access channel corresponding to the length of a further message part. Upon reception of the third message part by the receiving means 8, the detecting means 9 detects the end indicator bit "0" at the end of the third message part and recognizes that no further message parts are to be expected. Therefore, no further parts of the random access channel are reserved by the communication device 6. Since no further reservation is present, the random access channel can now be accessed again by different communication devices on a contention basis. The communication device 6 shown in FIG. 9 may also be adapted to receive random access bursts as explained in relation to FIGS. 6 and 7. In this case, the receiving means 8 may receive a preamble part, the preamble signature code of which has been chosen from the second section. The detecting means 9 of the communication device 6 detects that the signature code of the preamble part is a reserved signature code and that at least a second message part will follow after the usually transmitted first message part. Thus, the reserving means 11 reserves a further part of the random access channel so that a second message part may be received immediately after the first message part. Then, the receiving means 8 receives the first message part and the detecting means 9 detects a continuation indicator contained in the first message part. The continuation indicator contained in the first message part indicates that a third message part will follow after the second message part. The reserving means 11 correspondingly reserves a further part of the random access channel so that the third message part can be received after the second message part. Upon receiving the second message part in the receiving means 8, the detecting means 9 detects the end indicator contained in the second message part and therefore stops the reservation of further parts of the random access channel. Thus, no further message part for this random access burst will be received after the reception of the third message part.

In both above explained cases, reserving further parts of the random access channel by the reserving means 11 means that the preamble signature code of the received preamble parts of the random access burst are blocked from the communication device 6. In other words, access of other communication devices using the same preamble signature code and the same time offset for their preamble parts will not be possible during the reservation time.

As stated above, the communication device 6 further comprises a transmission means 10 for transmitting data in the telecommunication system, as e. g. an acquisition response answering a received preamble part. The communication device 6 further comprises modulators, demodulators, encoders, decoders and so on necessary for operating as a communication device in the digital telecommunication system.

In addition to the features of the message parts explained in relation to FIG. 5 or FIGS. 6 and 7, the random access bursts generated and transmitted by the communication device 1 and received by the communication device 6 have the same characteristics as the random access bursts explained in relation to FIGS. 1, 2, 3 and 4. E. g., the preamble parts of the random access bursts generated by the generating means 3 of the communication device 1 correspond identically to the preamble part of the random access burst explained in relation to FIG. 1. Further, the relation between the preamble signature and the spreading code of the message part of a random access burst explained in relation to FIG. 3 is also true for the random access bursts of the present invention. Further, the random access channel acquisition scheme explained in relation to FIG. 4 is also performed by the communication device 1 shown in FIG. 8 and the communication device 6 shown in FIG. 9.

The present invention provides a scheme for transmitting and receiving random access bursts in the digital telecommunication system, in which a higher amount of random access data can be transmitted within one random access burst. The main advantages are the increased length of the message data transmission, whilst the amount of a contention-based access is reduced, since the preamble part is only transmitted once even for several message parts. Further, the present scheme is compatible with the transmission and reception of singular random access bursts, in which only one preamble part and one message part are contained.

What is claimed is:

1. Device (1) for transmitting and receiving data in a digital telecommunication system, in which a random access channel having a number of random access slots for transmitting random access bursts is provided, with generating means (3) for generating a random access burst comprising a preamble part for acquiring a part of said ransom access channel and at least one message part for transmitting data in said acquired part of said random access channel, the number of message parts depending on an amount of data to be transmitted in the message parts, whereby in case that two or more message parts are generated, the generating means generates said random access burst with at least one continuation indicator indicating said two or more message parts, and transmitting means (4) for transmitting said random access burst generated by said generating means, whereby a preamble part of a random access burst having more than one message part is transmitted from random access slots that are different from random access slots used to transmit a preamble part of a random access burst having only one message part, thereby notifying the device to reserve the acquired part of the random access channel if needed.

2. Device (1) for transmitting and receiving data in a digital telecommunication system according to claim 1, characterized in, that said generating means (3) generates a random access burst comprising two or more message parts so that a continuation indicator is contained in at least the first message part.

3. Device (1) for transmitting and receiving data in a digital telecommunication system according to claim 1, characterized in, that said generating means (3) generates a random access burst comprising two or more message parts so that each preceding message part comprises a continuation indicator indicating an immediately succeeding message part.

4. Device (1) for transmitting and receiving data in a digital telecommunication system according to claim 1, characterized in, that said generating means generates a random access burst comprising two or more message parts so that the last of the message parts comprises an end indicator indicating the message part to be the last message part.

5. Device (1) for transmitting and receiving data in a digital telecommunication system, in which a random access channel for transmitting random access bursts is provided, with generating means (3) for generating a random access burst comprising a preamble part for acquiring a part of said ransom access channel and at least one message part for transmitting data in said acquired part of said random access channel, the number of message parts depending on an amount of data to be transmitted in the message parts, whereby in case that two or more message parts are generated, the generating means generates said random access burst with at least one continuation indicator indicating said two or more message parts, and transmitting means (4) for transmitting said random access burst generated by said generating means, whereby said random access channel comprises a number of random access slots being divided into a first section containing contention based random access slots and a second section containing reservation based random access slots, and whereby said transmitting means (4) transmits the preamble part of a random access burst comprising two or more message parts in said second section.

6. Device (1) for transmitting and receiving data in a digital telecommunication system according to claim 5, characterized in, that said generating means (3) generates said preamble of a random access burst comprising two or more message parts by randomly choosing one of the random access slots of the second section, whereby a preamble signature code allocated to the chosen random access slot serves as continuation indicator indicating that a second message part will be transmitted after the first message part.

7. Device (1) for transmitting and receiving data in a digital telecommunication system according to claim 5, characterized in, that said generating means (3) generates a random access burst comprising three or more message parts so that each first message part out of three immediately succeeding message parts comprises a continuation indicator indicating that a third message part will be transmitted after the second message part.

8. Device (6) for transmitting and receiving data in a digital telecommunication system, in which a random access channel having a number of random access slots for transmitting random access bursts is provided, with receiving means (8) for receiving a random access burst comprising a preamble part for acquiring a part of said random access channel and at least one message part for transmitting data in said acquired part of said random access channel, the number of message parts depending on an amount of data to be transmitted in the message part, detecting means (9) for detecting a continuation indicator in a received random access burst, said continuation indicator indicating that said random access burst comprises at least two message parts, and reserving means (11) for reserving a further part of said random access channel for receiving said message parts upon detection of said continuation indicator, whereby a preamble part of a random access burst having more than one message part is transmitted from random access slots that are different from random access slots used to transmit a preamble part of a random access burst having only one message part, thereby notifying the device-to reserve the acquired part of the random access channel if needed.

9. Device (6) for transmitting and receiving data in a digital telecommunication system according to claim 8, characterized in, that said detecting means (9) is adapted to detect said continuation indicator in at least a first received message part.

10. Device (6) for transmitting and receiving data in a digital telecommunication system according to claim 8, characterized in, that said reserving means (11), upon detecting said continuation indicator in a received message part, reserves a further part of said random access channel for an immediately succeeding message part.

11. Device (6) for transmitting and receiving data in a digital telecommunication system according to claim 8, characterized in, that said detecting means (9) is further adapted to detect an end indicator in a received message part, said end indicator indicating the message part to be the last message part of at least two message parts, whereby said reserving means terminates the reservation of the random access channel upon the detection of said end indicator.

12. Device (6) for transmitting and receiving data in a digital telecommunication system, in which a random access channel for transmitting random access bursts is provided, with receiving means (8) for receiving a random access burst comprising a preamble part for acquiring a part of said random access channel and at least one message part for transmitting data in said acquired part of said random access channel, the number of message parts depending on an amount of data to be transmitted in the message part, detecting means (9) for detecting a continuation indicator in a received random access burst, said continuation indicator indicating that said random access burst comprises at least two message parts, and reserving means (11) for reserving a further part of said random access channel for receiving said message parts upon detection of said continuation indicator, whereby said random access channel comprises a number of random access slots being divided into a first section containing contention based random access slots and a second section containing reservation based random access slots, and whereby after the reception of a preamble part of a random access burst in said second section, said reserving means (11) reserves a further part of said random access channel for receiving at least two message parts.

13. Device for transmitting and receiving data in a digital telecommunication system according to claim 12, characterized in, that said detecting means, after the reception of a preamble part of a random access burst in said second section, treats the preamble signature code of said preamble part as the continuation indicator indicating that a second message part will be transmitted after the first message part, whereby said reserving means (11) reserves a further part of said random access channel for receiving said second message part.

14. Device for transmitting and receiving data in a digital telecommunication system according to claim 12, characterized in, that said reserving means (11), upon detection of a continuation indicator in a received message part of a random access burst, reserves a further part of said random access channel for receiving a further message part after the immediately succeeding message part.

15. Method for transmitting and receiving random access bursts in a random access channel of a digital telecommunication system with said random access channel having a number of random access slots, comprising the steps of generating a random access burst comprising a preamble for acquiring a part of said random access channel and at least one message part for transmitting data in said acquired part of said random access channel, the number of message parts depending on an amount of data to be transmitted in the message parts, whereby in case that two or more message parts are generated, said random access burst is generated with a continuation indicator indicating a succeeding message part, transmitting said generated random access burst, receiving said random access burst detecting said continuation indicator in said received random access burst and reserving a further part of said random access channel for receiving at least two message parts, whereby a preamble part of a random access burst having more than one message part is transmitted from random access slots that are different from random access slots used to transmit a preamble part of a random access burst having only one message part, thereby notifying the digital telecommunication system to reserve the acquired part of the random access channel if needed.

16. Method for transmitting and receiving random access bursts in a digital telecommunication system according to claim 15, characterized in, that in a random access burst comprising two or more message parts a continuation indicator is contained in at least the first message part.

17. Method for transmitting and receiving random access bursts in a digital telecommunication system according to claim 15, characterized in, that in a random access burst comprising two or more message parts each preceding message part comprises a continuation indicator indicating an immediately succeeding message part.

18. Method for transmitting and receiving random access bursts in a digital telecommunication system according to claim 15, characterized in, that in a random access burst comprising two or more message parts the last of the message parts comprises an end indicator indicating the message part to be the last message part.

19. Method for transmitting and receiving random access bursts in a digital telecommunication system, with the steps of generating a random access burst comprising a preamble for acquiring a part of said random access channel and at least one message part for transmitting data in said acquired part of said random access channel, the number of message parts depending on an amount of data to be transmitted in the message parts, whereby in case that two or more message parts are generated, said random access burst is generated with a continuation indicator indicating a succeeding message part, transmitting said generated random access burst, receiving said random access burst detecting said continuation indicator in said received random access burst and reserving a further part of said random access channel for receiving at least two message parts, and whereby said random access channel comprises a number of random access slots being divided into a first section containing contention based random access slots and a second section containing reservation based random access slots, whereby the preamble part of a random access burst comprising two or more message parts is transmitted in said second sections.

20. Method for transmitting and receiving random access bursts in a digital telecommunication system according to claim 19, characterized in, that said preamble of a random access burst comprising two or more message parts is generated by randomly choosing one of the random access slots of the second section, whereby a preamble signature code allocated to the chosen random access slot serves as continuation indicator indicating that a second message part will be transmitted after the first message part.

21. Method for transmitting and receiving random access bursts in a digital telecommunication system according to claim 19, characterized in, that in a random access burst comprising three or more message parts each first message part out of three immediately succeeding message parts comprises a continuation indicator indicating that a third message part.

*22. Device for transmitting data to a receiver device in a cellular digital telecommunication system, said device comprising;*

*a unit configured to provide a random access channel for transmitting random access bursts, wherein said random access channel has time windows, each time window comprising a number (n×m) of random access slots, each random access slot being defined by one of n preamble signatures and one of m time offsets, whereby said random access slots of each time window are divided in at least two different sections,*

*a generating unit configured to generate a random access burst comprising a preamble part for acquiring a part of said random access channel and at least two message parts for transmitting data in said acquired part of said random access channel, a next message part immediately following a preceding message part and each said message part exhibiting a fixed length, and*

*a transmitting unit configured to transmit said random access burst including said at least two message parts and for transmitting said preamble part of said random access burst generated by said generating means to said receiver device by using a pre-selected section of said at least two different sections.*

*23. The device for transmitting according to claim 22, wherein said preamble signature comprises 16 preamble signatures which are allocated to one cell of said cellular digital telecommunication system.*

*24. Device for transmitting data to a receiver device in a cellular digital telecommunication system, said device comprising;*

*a generating unit configured to generate a random access burst comprising a preamble part for acquiring a part of said random access channel and two message parts for transmitting data in said acquired part of said random access channel, a next message part immediately following a preceding message part and each said message part exhibiting a fixed length,*

*a unit configured to provide random access slots for transmitting n×m random access bursts, each random access slot being defined by one of n preamble signatures and one of m time offsets, whereby said random access slots are divided into at least two different sections,*

*a unit configured to pre-select one section from said different sections, and*

*a transmitting unit configured to transmit said random access burst including said two message parts and for transmitting said preamble part of said random access burst generated by said generating means to said receiver device by using said pre-selected one section of said random access slots.*

*25. Method for transmitting data to a receiver device in a cellular digital telecommunication system comprising the steps of:*

*transmitting random access bursts in a random access channel having time windows, each time window comprising a number (n×m) of random access slots, each random access slot being defined by one of n preamble signatures and one of m time offsets, whereby said random access slots of each time window are divided in at least two different sections,*

*generating a random access burst comprising a preamble part for acquiring a part of said random access channel and at least two message parts for transmitting data in said acquired part of said random access channel, a next message part immediately following a preceding message part and each said message part exhibiting a fixed length, and*

*transmitting said random access burst including said at least two message parts and transmitting said preamble part of said random access burst to said receiver device by using a pre-selected section of said at least two different sections.*

*26. The method of claim 25, wherein said preamble signature comprises 16 preamble signatures which are allocated to one cell of said cellular digital telecommunication system.*

*27. A method for transmitting data to a receiver device in a cellular digital telecommunication system comprising the steps of:*

*generating a random access burst comprising a preamble part for acquiring a part of a random access channel and two message parts for transmitting data in said acquired part of said random access channel, a next message part immediately following a preceding message part and each said message part exhibiting a fixed length,*

*transmitting n×m random access bursts in random access slots, each random access slot being defined by one of n preamble signatures and one of m time offsets, whereby said random access slots are divided into at least two different sections,*

*pre-selecting one section from said different sections, and*

*transmitting said random access burst including said two message parts and transmitting said preamble part of said random access burst to said receiver device by using said pre-selected one section of said random access slots.*

* * * * *